US008473722B2

(12) United States Patent
Meyer

(10) Patent No.: US 8,473,722 B2
(45) Date of Patent: Jun. 25, 2013

(54) PROCESSOR ARCHITECTURE FOR EXACT POINTER IDENTIFICATION

(75) Inventor: Matthias Meyer, Ludwigsburg (DE)

(73) Assignee: Universitaet Stuttgart, Stuttgart (DE)

( * ) Notice: Subject to any disclaimer, the term of this patent is extended or adjusted under 35 U.S.C. 154(b) by 1518 days.

(21) Appl. No.: 10/563,122

(22) PCT Filed: Jul. 1, 2004

(86) PCT No.: PCT/EP2004/007175
§ 371 (c)(1),
(2), (4) Date: Apr. 21, 2008

(87) PCT Pub. No.: WO2005/003960
PCT Pub. Date: Jan. 13, 2005

(65) Prior Publication Data
US 2008/0209149 A1    Aug. 28, 2008

(30) Foreign Application Priority Data

Jul. 1, 2003   (DE) .................................. 103 29 680

(51) Int. Cl.
*G06F 9/34*        (2006.01)
(52) U.S. Cl.
USPC ..................................... 712/225; 707/793
(58) Field of Classification Search
USPC ................. 711/202; 712/5, 26, 225; 707/793, 707/955
See application file for complete search history.

(56) References Cited

U.S. PATENT DOCUMENTS

| | | | |
|---|---|---|---|
| 3,656,178 A * | 4/1972 | De Maine et al. ............... 341/87 |
| 4,334,269 A | 6/1982 | Shibasaki et al. |
| 5,778,395 A * | 7/1998 | Whiting et al. ........................ 1/1 |
| 5,860,092 A * | 1/1999 | Breid et al. .................... 711/118 |
| 5,897,656 A * | 4/1999 | Vogt et al. ...................... 711/141 |
| 5,900,001 A | 5/1999 | Wolczko et al. |
| 5,903,899 A | 5/1999 | Steele, Jr. |
| 5,903,900 A | 5/1999 | Knippel et al. |
| 5,907,716 A * | 5/1999 | Yoshimura ....................... 710/54 |
| 5,920,876 A * | 7/1999 | Ungar et al. ........................... 1/1 |
| 5,946,318 A * | 8/1999 | Post .............................. 370/412 |
| 6,385,113 B1 * | 5/2002 | Longwell et al. ............. 365/222 |
| 6,473,777 B1 | 10/2002 | Hendler et al. |
| 6,505,206 B1 * | 1/2003 | Tikkanen et al. ............. 707/797 |

(Continued)

OTHER PUBLICATIONS

Wikipedia: The Free Encyclopedia www.wikipedia.org search terms: Processor register, Pointer (computer programming), Interrupt, Stack (abstract data type), Classic RISC pipeline, Cache (computing), Reduced instruction set computing, Coprocessor.*

(Continued)

*Primary Examiner* — Aimee Li
(74) *Attorney, Agent, or Firm* — Venable LLP; Robert Kinberg; Christopher B. Tokarczyk

(57) ABSTRACT

The present invention relates to an object-based processor architecture which allows exact pointer identification by strictly separating pointers and data from one another in the memory and in the processor registers. The access to the memory is performed exclusively via pointers which refer to objects. An object contains separate areas for pointers and data and an attribute field for describing the length of the two areas. Both the pointers in the pointer registers and also the pointers in the pointer areas of the objects directly contain the address of the objects to which they refer. The suggested processor architecture allows the integration of automatic garbage collection, which may be implemented completely or partially in hardware. A real-time capable garbage collection may be implemented especially efficiently through hardware support.

20 Claims, 7 Drawing Sheets

U.S. PATENT DOCUMENTS

| | | | | |
|---|---|---|---|---|
| 6,574,711 B2 * | 6/2003 | Sumita | | 711/129 |
| 6,751,583 B1 * | 6/2004 | Clarke et al. | | 703/17 |
| 6,895,579 B2 * | 5/2005 | Lueh | | 717/148 |
| 7,260,683 B2 * | 8/2007 | Sumita | | 711/129 |
| 7,444,475 B2 * | 10/2008 | Sumita | | 711/129 |
| 7,454,555 B2 * | 11/2008 | Ware et al. | | 711/5 |
| 2001/0010071 A1 | 7/2001 | Vlot et al. | | |
| 2002/0107877 A1 * | 8/2002 | Whiting et al. | | 707/204 |
| 2002/0169556 A1 | 11/2002 | Sokolov et al. | | |
| 2003/0196038 A1 * | 10/2003 | Sumita | | 711/119 |
| 2004/0184470 A1 * | 9/2004 | Holden | | 370/412 |

OTHER PUBLICATIONS

German Search Report, dated Apr. 3, 2004, issued for corresponding German Application No. 103 29 680.8-53.

German Search Report, dated Oct. 20, 2005, issued for corresponding German Application No. 103 29 680.8-53.

Kernighan, Brian W., et al., "The C Programming Language," Second Edition, 1988, ISBN 0-13-110370-9.

Levy, H.M., *Capability-Based Computer Systems*, "The Intel iAPX 432" Digital Press, 1984, pp. 159-186.

* cited by examiner

| Commands which read the pointer register | | | |
|---|---|---|---|
| store pointer | (store pointer) | sp | py[index] := pz |
| copy pointer | (copy pointer) | cpp | px := pz |
| compare pointers | (compare pointers) | cmpp | dx := py,pz |

| Commands which write the pointer register | | | |
|---|---|---|---|
| allocate object | (allocate object) | alc | px := dy,dz |
| load pointer | (load pointer) | lp | px := py[index] |
| copy pointer | (copy pointer) | cpp | px := pz |
| create const. pointer | (create const. pointer) | ccp | px := dy |

| Commands which dereference the pointer register | | | |
|---|---|---|---|
| load data | (load data) | ld | dx := py[index] |
| load pointer | (load pointer) | lp | px := py[index] |
| store data | (store data) | sd | py[index] := dz |
| store pointer | (store pointer) | sp | py[index] := pz |
| read π attribute | (read π-attribute) | pattr | dx := py |
| read δ attribute | (read δ-attribute) | dattr | dx := py | dx, dy, dz    data register
px, py, pz    pointer register
index    expression for type of indexing

Fig. 4

| RETRIEVE | DECODE | EXECUTE | MEMORY | ATTRIBUTES |
|---|---|---|---|---|
| load data | read operands | ▯ /δ_π  AGU | ≡ ▯ load data | ▯ — |
| load pointer | read operands | ▯ /δ_π  AGU | ≡ / load pointer | / load attribute |
| store data | read operands | ▯ /δ_π  AGU, MUX | ≡ ▯ store data | ▯ — |
| store pointer | read operands | ▯ /δ_π  AGU, MUX | ≡ / store pointer | / — |
| lay pointer on stack | read operands | ▯ /δ_π  ALU, AGU, MUX | ▯ ≡ / store pointer | ▯ — |
| compare pointers | read operands | / ALU | ▯ — | ▯ — |
| read attributes δ,π | read operands | δ_π  ALU | ▯ — | ▯ — |
| allocate object | read operands | ▯ AGU, PGU | ≡ /δ_π  initialize pointer | /δ_π  store attribute |
| produce const. pointer | read operands | ▯ PGU | / — | / load attribute |
| copy pointer | read operands | /δ_π  PGU | /δ_π  — | /δ_π  — |

▯ data word    / pointer word    δ_π attribute words (δ,π)    ≡ memory address

Fig. 8

PROCESSOR ARCHITECTURE FOR EXACT POINTER IDENTIFICATION

TECHNICAL FIELD

The present invention relates to a processor architecture, in which the access to a memory occurs via pointers which refer to objects.

Managing the complexity of software is the largest requirement in software development. High-quality, reliable systems may only be implemented when software is decomposed into comprehensible and controllable modules and described abstractly. In order to achieve this, object-oriented programming languages have been used for some years.

A central problem in the implementation of object-oriented programming languages is dynamic memory management. A few object-oriented languages such as C++ are still built on manual memory management, i.e., memory may both be requested and also released again under the responsibility of the programmer. However, this approach has the disadvantage that natural modeling of a system, which is tailored to the problem, is often not possible, since the memory management must also be implemented during design of the system. Furthermore, the manual release of memory is the cause of an entire class of program errors. For example, if a memory area is released although references still exist to this memory area, this may have catastrophic consequences in the further program execution. It is especially serious in this case that the consequences of the errors caused by the still existing pointers to the already released memory area (dangling references) are a function of many factors and therefore are hardly reproducible and are only localizable with difficulty. For these reasons, almost all modern programming languages, such as Java, are based on dynamic memory management having automatic garbage collection. In systems having this dynamic memory management, memory areas may not be returned under the responsibility of the program. Instead, a garbage collector only releases the memory areas automatically when they are securely no longer referenced by a program. Because of this principle, no "dangling references" may arise. Furthermore, the use of this technology increases the productivity of the programmer, since he may now turn completely to solving the actual problem. Finally, the software prepared is of higher quality, since the probability of hidden program errors in a system having dynamic memory management is significantly lower than in a system having manual memory management.

RELATED ART

There are numerous algorithms for the automatic release of dynamically created memory areas, which are known to those skilled in the art under the concepts of reference counting, copying, and mark sweep collection. For an overview of these algorithms, reference is made to R. Jones, R. Lins: "Garbage Collection: Algorithms For Automatic Dynamic Memory Management", John Wiley & Sons, 1996.

Simple implementations of these algorithms interrupt the application program for the entire duration of a garbage collection cycle. They typically cause long and unpredictable pauses in the program execution and are therefore not suitable for interactive systems or real-time environments.

Incremental and concurrent methods allow the program execution to be continued during a garbage collection cycle. However, they require synchronization between the application program and garbage collector. The costs of this synchronization in software are significant, however, since, depending on the methods used, a short code sequence must be incorporated either before each pointer load (read barrier) or before each pointer store (write barrier), in order to determine whether the associated object has already been processed by the garbage collector.

Many incremental methods are described as "real-time capable", because the pauses caused by the garbage collector are too short in most cases to be registered by the user. However, hard real-time capability requires the guarantee of a constant upper limit for the response time of the system. Since software-based methods typically depend on non-interruptible operations such as the examination of all pointers of the root set (registers and stack) or the processing of an entire object, they do not fulfill hard real-time requirements. Software solutions which manage without indivisible operations of unlimited duration are known, but the overhead of these solutions in computing time and memory is significant.

A basic problem of all technologies for automatic garbage collection is finding and identifying pointers. If pointers cannot be clearly differentiated from non-pointers, only a conservative garbage collection may be performed. This means that every bit pattern which could represent a pointer must also be viewed as a pointer in order to avoid the release of memory which is still in use. Therefore, no compacting methods, which move objects and update pointers, may be used in conservative garbage collection. However, the memory becomes fragmented without compacting methods.

To avoid these problems and to perform exact garbage collection, greater outlay is used in the search for and identification of pointers. In many object-oriented languages, pointers and objects may be identified via type descriptors, which are contained in every object. The localization of pointers in the program stack and in the process registers is more difficult, however, particularly in connection with optimizing compilers. It is possible to maintain data structures in which the stack positions and the processor register which currently contain pointers are specified, but the costs to implement data structures of this type during the program execution are very high. For this reason, most software-based methods use tables generated by the compiler which describe the position of the pointers in the program stack and in the registers. For every program point at which garbage collection may be performed, a set of tables of this type is prepared. Implementation of this technology results in significant inflation of the program code, however. Furthermore, real-time systems must ensure that threads to be suspended reach the next program point of this type within a limited time span.

Therefore, numerous problems must be overcome using the currently existing systems, which primarily use automatic garbage collection in software. This is because, above all, the software must simulate functions that the underlying hardware does not provide. Many problems in regard to efficiency and real-time capability may be overcome if the processor itself performs the automatic garbage collection entirely or partially in hardware. However, it is absolutely necessary for the processor to be able to identify pointers for this purpose.

In the following, of the numerous known architectures, only two are described for exemplary purposes, which support exact pointer identification and/or automatic garbage collection and for which the subject matter of the present invention is significant.

Thus, architectures have been known since 1966 which use capabilities instead of direct pointers in order to address memory areas. Capabilities contains statements on the access authorization and identification of objects. They do not contain the physical address of the object, but rather a reference to a descriptor which describes the location, the size, and for the properties of the object. An example of a processor having an architecture of this type is the Intel iAPX 432, as is described, for example, in H. M. Levy: "Capability-Based Computer Systems", Digital Press, 1984, pages 159-186. In this architecture, a capability is associated with the associated object through a two-stage mapping process. A unique entry in an object table exists for every object, which describes the location, the size, and the status of the object. Every object comprises two areas: a data area and an area for capabilities. Exact capability identification is made possible in this way.

The iAPX 432 is extremely inefficient due to lack of a register set and the doubly indirect addressing of an object via capabilities and object descriptors. Furthermore, it does not perform automatic garbage collection itself. The garbage collection must be performed in software and is not real-time capable.

All known methods for identifying direct pointers use a special identification bit (tag) in every memory word to differentiate between pointers and non-pointers. An example of this is the system and hardware module for incremental garbage collection in real-time described in U.S. Pat. No. 5,560,003 A, which is composed of two memory banks and a local processor that performs the garbage collection. Every memory bank is supported by an object space manager which maps addresses to the start address of the corresponding object upon each memory access. Because of its complexity, this object space manager must be implemented as a separate ASIC, which occupies a similar chip area as the memory itself. A system of this type is very costly. Furthermore, the identification of pointers with the aid of identification bits causes additional outlay in the form of computing time and memory required.

Because of the continuously increasing complexity of the software in embedded systems, great efforts have been undertaken for several years to also make the advantages of automatic garbage collection accessible to this economically important field. The largest piece counts are achieved precisely in this area of modern information technology. Since the product cycles become shorter and shorter through continuous innovation, the demand for robust and real-time capable platforms for embedded systems for modern object-oriented languages increases continuously. However, for these applications automatic garbage collection is still considered a luxury in most cases, which cannot be afforded in spite of the undisputed advantages of automatic garbage collection.

Proceeding from this related art, the object of the present invention is to specify a processor architecture for object-based and object-oriented programs which allows cost-effective exact pointer identification and therefore opens the path for efficient and real-time capable automatic garbage collection which may be implemented entirely or partially in hardware.

DESCRIPTION OF THE INVENTION

The object is achieved by the processor architecture according to Claim 1. Advantageous embodiments of the processor architecture are the subject matter of the subclaims or may be inferred from the following description and the exemplary embodiments.

In the scope of the present patent application, the term word is understood as a data unit which may be loaded from the memory or stored in the memory using a single processor instruction. An object is understood as a coherent set of memory words in which every word is associated exclusively with a single object. A pointer is understood as a word which refers to an object. The term null represents a permanently predefined pointer value which is used in order to refer to no object.

In the present processor architecture for object-based and object-oriented programs, the memory is exclusively accessed via pointers which refer directly to objects. An object is exclusively stored in a coherent memory area, i.e., the memory areas occupied by two objects may not overlap. In every object, pointers are stored in a pointer area and data is stored in a data area separately from one another. In addition, information about the length of the pointer area and the length of the data area are stored in every object. This length information is referred to in the following as attributes. It is possible at any time to determine the size of an object and to uniquely delimit the pointers and data in an object from one another with the aid of the attributes.

The present processor architecture provides separate pointer register and data register sets. In this case, pointer registers are exclusively provided for operations using objects, for example, for memory accesses, and are not used for other tasks. It is thus ensured in particular that no arbitrary values may be written in pointer registers and no arithmetic operations may be performed using pointer registers.

The pointers in the pointer area of objects and in the pointer registers directly contain the addresses of the objects in memory.

Using the present object-based processor architecture, a strict separation of pointers and non-pointers (data) is implemented in this way, so that exact pointer identification is possible without the necessity for identification bits. Through this exact ability to identify the pointers in the processor registers and in the memory, which is ensured by the hardware, automatic garbage collection, which may be entirely or partially implemented in hardware, may be integrated on the processor level. On this basis, real-time capable systems having automatic garbage collection, which may be implemented particularly efficiently, are possible. Therefore, software which must be executed on the processor is necessary neither for the garbage collection algorithm itself nor for the required synchronization between processor and garbage collector. The processor must merely yield a part of the memory bandwidth to the garbage collector.

A further advantage of the architecture is that the garbage collection manages without the cooperation of the compiler and/or the runtime system and may therefore be implemented especially robustly.

The hardware effort for the implementation of the garbage collection is comparatively low, compared to the effort for the processor itself. For this reason, such processors may be manufactured just as cost-effectively as typical microprocessors or microcontrollers.

In the present processor architecture, it is preferably ensured by the processor that every word identified as a pointer either contains the address of an existing object or is null. In this preferred embodiment, the fixed rules (system invariants) that every memory word or register may be identified as to whether it is a pointer or not, and, in addition, every pointer value is either null or contains the address of an existing object, are thus maintained by the processor architecture. By maintaining these system invariants, the exact identification of the pointers in the system is possible at every clock cycle.

Preferably, new objects are created by a special object creation instruction to which the attributes of the object to be created are transferred as parameters. This object creation instruction initializes all pointers of the pointer area with the null value before the object may be accessed. The system invariants are not infringed in this way.

In a refinement for hard real-time requirements, the object creation instruction is implemented interruptibly. If an object creation instruction is interrupted, incompletely initialized objects are created in such a way that the interrupted object creation instruction may be resumed at a later point in time. Incompletely initialized objects are uniquely identified by the processor.

Preferably, constant objects which existed as part of a read-only memory area even before the program start are supported by the processor architecture. Pointers to constant objects are identified uniquely by the processor.

In the present processor architecture, an area of the memory is preferably reserved for a program stack in a known way. The program stack is divided for this purpose into a pointer stack area and a data stack area, the first position not occupied by the stack in each case being specified by a stack index which is managed in a reserved data register in each case.

If multiple stacks are used, the stack index of the currently inactive stack is preferably stored as an attribute in the associated stack objects. Furthermore, the stack objects are preferably stored as static objects not in the heap, but rather in a static memory area managed by the operating system and pointers to objects of this type (static pointers) are identified in a special way.

For efficient implementation of the processor architecture, every pointer register is preferably accompanied by an attribute register in which the attributes of the object which belong to the object referenced by the pointer in the pointer register are stored. In this embodiment, an additional pipeline stage for loading the attributes is provided. Furthermore, an attribute cache for accelerating the accesses is preferably used in this pipeline stage.

All further pipeline stages and functional units required for the program execution and the typical optimizations, such as instruction and data caches or units for branch prediction, may be implemented according to the related art in an implementation of the present processor architecture.

BRIEF DESCRIPTION OF THE FIGURES

The processor architecture according to the present invention is described in greater detail in the following on the basis of an exemplary embodiment in connection with the figures.

FIG. 4 shows a table having a classification of the pointer-related instructions;

FIG. 8 schematically shows the decomposition of pointer-related instructions to the stages of a pipeline according to FIG. 7.

WAYS OF IMPLEMENTING THE INVENTION

In the following, an example of an embodiment of the processor architecture according to the present invention is described, which is based above all on the object of achieving exact pointer identification without using identification bits (tags), being based on generally applicable RISC instruction sets, which may be implemented efficiently, and not requiring indivisible operations whose execution time exceeds several clock cycles.

The processor architecture described guarantees the system invariants that
  1. every memory word or register may be identified as to whether it represents a pointer or not, and
  2. every pointer value is either null or is uniquely associated with an existing object.

Figure 1:
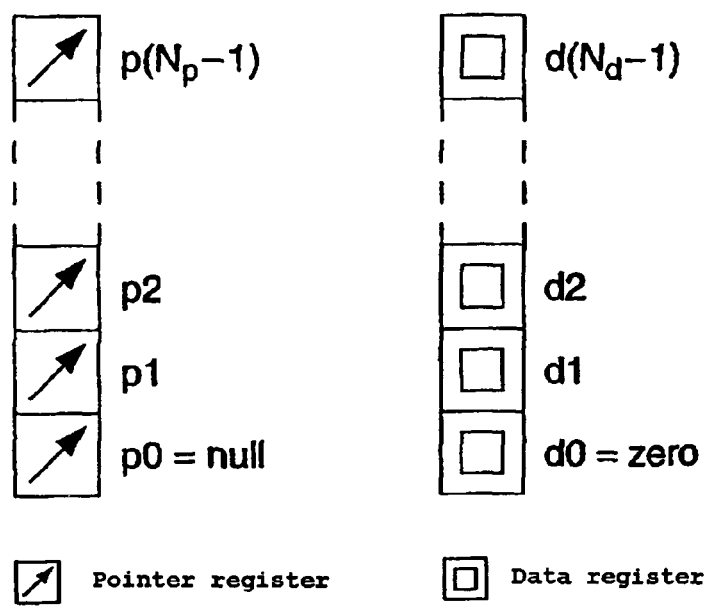
FIG. 1 schematically shows the register model of the present processor architecture.

The present processor architecture provides separate data and pointer register sets, as is schematically illustrated in FIG. 1. The data registers illustrated in the right part are used as multipurpose registers, while the pointer registers illustrated in the left part are used for access to objects in memory. $N_p$ specifies the number of pointer registers, $N_d$ specifies the number of the data registers. In order to fulfill the system invariants, it must be ensured that it is not possible to write arbitrary values in pointer registers, such as copying the value of a data register in a pointer register or performing arithmetic operations using pointer registers.

Figure 2:
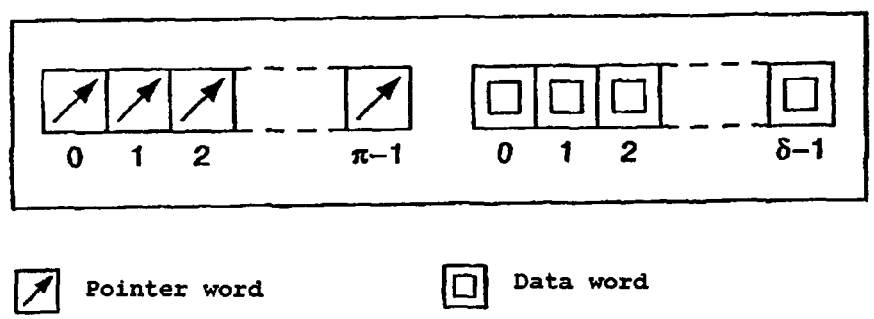
FIG. 2 schematically shows the object model of the present processor architecture.

The memory model of the present processor architecture is object-based. Every object is composed of a data area and a pointer area, which are strictly separated from one another. FIG. 2 shows the schematic structure of an object of this type having the corresponding pointer words in the pointer area (left part of the figure) and the data words in the data area (right part of the figure) of the object. The number of data words in the data area is described by the $\delta$ attribute ($\delta \geq 0$), and the number of pointers in the pointer area is described by the n attribute ($\pi \geq 0$). The size of an object described by the attributes is fixed when the object is generated and may not be changed later. The attributes are part of the object and are stored therein in a separate attribute area.

The specific part of the instruction set for the present processor architecture solely comprises pointer-related instructions including load and store instructions. The embodiment of other instructions, such as arithmetic instructions or instructions for program control, may be selected independently of the architecture described and is not part of the present invention.

The instruction set of the architecture described has a special object creation instruction which is used to generate a new object and a pointer to this object. The object creation instruction (allocate object) receives the values of the $\pi$ and $\delta$ attributes for the object to be created as arguments and stores the pointer to the newly created object in a pointer register. Every pointer value in the pointer area of the created object is initialized using null, before the pointer to the object is visible for the program. There is no instruction for erasing an object. Objects may only be erased by an automatic garbage collection on the processor level.

Load and store instructions are used for the access to words within an object. The processor architecture provides different load and store instructions for the access to pointer values and data words. The "load data" and "store data" instructions move data words exclusively between data areas of objects and data registers. The "load pointer" and "store pointer"

instructions move pointers exclusively between pointer areas of objects and pointer registers. The load and store instructions identify the memory word which is to be accessed with the aid of a pointer register which contains the pointer to the object and with the aid of a positive integer index. To calculate an index—analogously to the addressing modes of conventional architectures—different "indexing modes" may be used, using data registers, constant offsets, and scaling factors, for example.

Upon access to an object, range checks must be performed in order to ensure that no accesses to words outside the particular referenced object are possible. Such accesses may have catastrophic consequences and infringe the system invariants. For this reason, in case of a bounce violation, the memory access is terminated and a corresponding exception handler is initiated. For similar reasons, instructions which attempt to dereference a null pointer are aborted.

The attributes of an object may be queried by two "read attribute" instructions.

In contrast to the multiple "register to register" instructions, which are typically implemented for operations on data registers, a strongly restricted set of two instructions for pointer-related "register to register" instructions is defined by the present architecture. The "copy pointer" instruction copies the content of a pointer register to another pointer register, while the "compare pointers" instruction checks whether two pointers refer to the same object.

FIG. 4 shows a summary of the pointer-related instructions defined by the present processor architecture and categorizes them as to whether they read, write, or dereference pointer registers. The register which is read, written, or dereferenced in each case is printed in bold.

Because of the unstructured and highly dynamic nature of program stacks, these represent one of the greatest demands in regard to the pointer identification in the scope of automatic garbage collection. In the present processor architecture, the program stack is viewed as a stack object which—like any object—has a data area and a pointer area and therefore may be viewed as two separate stacks. A pointer register is reserved in order to keep the pointer on the stack object. A stack index is used in each of the two stack areas in order to divide the corresponding area into the actual stack and a currently unoccupied area. The stack index relates in the present example to the first unoccupied memory location. A stack index of 0 represents an empty stack. The two stack indices are identified as the data stack index (dsix) and pointer stack index (psix). Each of these indices is kept in a special data register reserved for this purpose.

If the stack object is treated like a typical object, the system may not differentiate whether a pointer belongs to the currently occupied pointer stack or to the unoccupied part of the pointer stack area. Since every word in the pointer stack area is identified as a pointer, the unused area of the pointer stack area may contain many pointers which refer to objects which are no longer necessary. A garbage collector may not release these objects since pointers to these objects still exist. A possible solution to this object is to overwrite every pointer value with null as soon as the corresponding pointer is removed from the stack. However, this results in an undesired overhead, particularly if multiple pointers are to be removed from the stack, as is the case during the disallocation of a stack frame at the end of a subprogram, for example.

Figure 3:
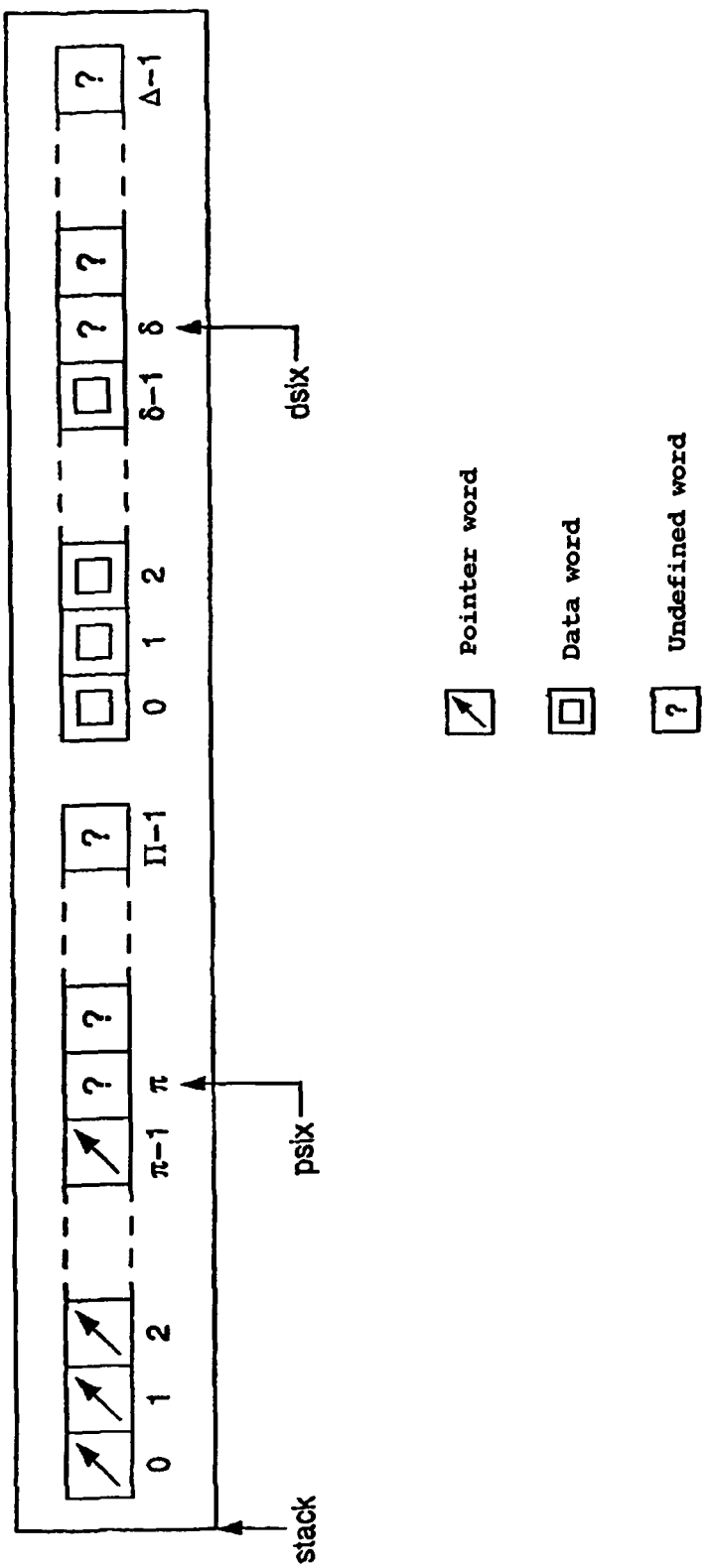
FIG. 3 schematically shows the implementation of the program stack as a stack object.

For the example described here of an advantageous embodiment of the processor architecture, an achievement of the object is therefore selected which considers the dynamic size of a stack. For this purpose, the stack object, as illustrated in FIG. 3, is described by two attribute pairs, of which one pair $(\pi, \delta)$ specifies the current stack size and a second pair $(\pi, \Delta)$ specifies the maximum stack size. The $\pi$ attribute corresponds in this case to the value of the pointer stack index psix, the $\delta$ attributes corresponds to the value of the data stack index dsix. The stack attributes $\pi$ and $\Delta$ are kept in system registers which are not visible for user programs. Only pointers having indices smaller than $\pi$ are viewed as pointers in regard to the pointer identification and the system invariants.

Memory words within the stack are addressed by standard load and store instructions. Words may be removed from the stack by reducing the value of the corresponding stack index using standard arithmetic instructions. To maintain the system invariants, a special instruction is provided to push a pointer onto the pointer stack, which non-interruptibly stores the pointer on the first unoccupied memory location of the pointer stack area and increases the pointer stack index. This is the only instruction permitted to increase the pointer stack index.

In the processor architecture described up to this point, the memory may be accessed exclusively via pointers, and the single possibility for creating pointers is to create new objects with the aid of the object creation instruction. However, it is also to be possible to access constant data which exists as part of the program code even before the start of the program for example. Examples of such constant data are constant linked lists or structures generated by the compiler such as branch tables or type descriptors.

The present example of an advantageous embodiment of the processor architecture therefore introduces constant objects. A constant object is an unchangeable object, which is stored as a part of the program code or in a special area which is reserved for constant objects. A special "create constant pointer" instruction is used for the creation of pointers to constant objects, referred to in the following as constant pointers. Memory accesses via constant pointers are restricted to read accesses, and the pointer area of a constant object may contain exclusively constant pointers or null pointers. Constant objects are differentiated from ordinary objects by a $\phi$ attribute, which is provided to differentiate special types of objects.

In many systems, separate program stacks are used for different types of operations such as user mode and operating system mode. In addition, systems having multiple concurrent execution threads (multithreaded systems) require separate program stacks for each execution thread.

All of these stacks are typically managed by the operating system and are not located in the memory area monitored by garbage collection (heap).

In order to allow the operating system to manage memory areas outside the heap memory area, static objects are provided. Static objects are exclusively created in the operating system mode and located in a memory area especially provided for this purpose. Static objects are also identified via the $\phi$ attribute. Pointers to static objects (static pointers) are never visible for user programs.

To maintain the system invariants, every pointer in a newly generated object must be initialized with the null value before the associated object creation instruction may be terminated. Therefore, the execution time for the object creation instruction is not limited by a small time constant. This is not acceptable for hard real-time applications.

In order to implement the object creation instruction as interruptible, uninitialized (more precisely: incompletely initialized) objects are introduced into the advantageous embodiment of the processor architecture described. Uninitialized objects are created only when the object creation instruction is interrupted before it completes. Pointers to uninitialized objects are only visible in the operating system mode and may never be dereferenced. Uninitialized objects are—like static and constant objects—identified by the φ attribute.

The exemplary advantageous embodiment of the processor architecture described therefore supports four different types of objects: normal dynamic objects, uninitialized dynamic objects, constant objects, and static objects. The φ attribute is used to differentiate the object types and may assume one of the four values (norm, uini, const, stat). In an implementation of the architecture, the φ attribute may be stored in the pointer to an object and/or in the object itself.

Normal dynamic objects and uninitialized dynamic objects are located in the heap memory area, static objects are located in the static memory area, and constant objects are located in the memory area provided for the program code and/or constant data. Since static and uninitialized objects are restricted to the operating system mode, they are identified as system objects.

From the viewpoint of automatic garbage collection, the four types of objects may be characterized by how they are treated by a compacting garbage collector. Typical dynamic objects must be searched for pointers and moved during compacting. Static objects must be searched for pointers, but may not be moved. Uninitialized objects, in contrast, must be moved during the compacting, but may not be searched for pointers, since they may contain invalid pointers. Finally, constant objects must neither be searched for pointers nor moved by the garbage collector.

A possible implementation of the suggestive processor architecture is explained for exemplary purposes in the following. A word value of 32-bit is assumed for the implementation. The memory is addressable byte by byte in order to also allow byte and halfword accesses within the data area. Words must be aligned to addresses divisible by four.

Figure 5:
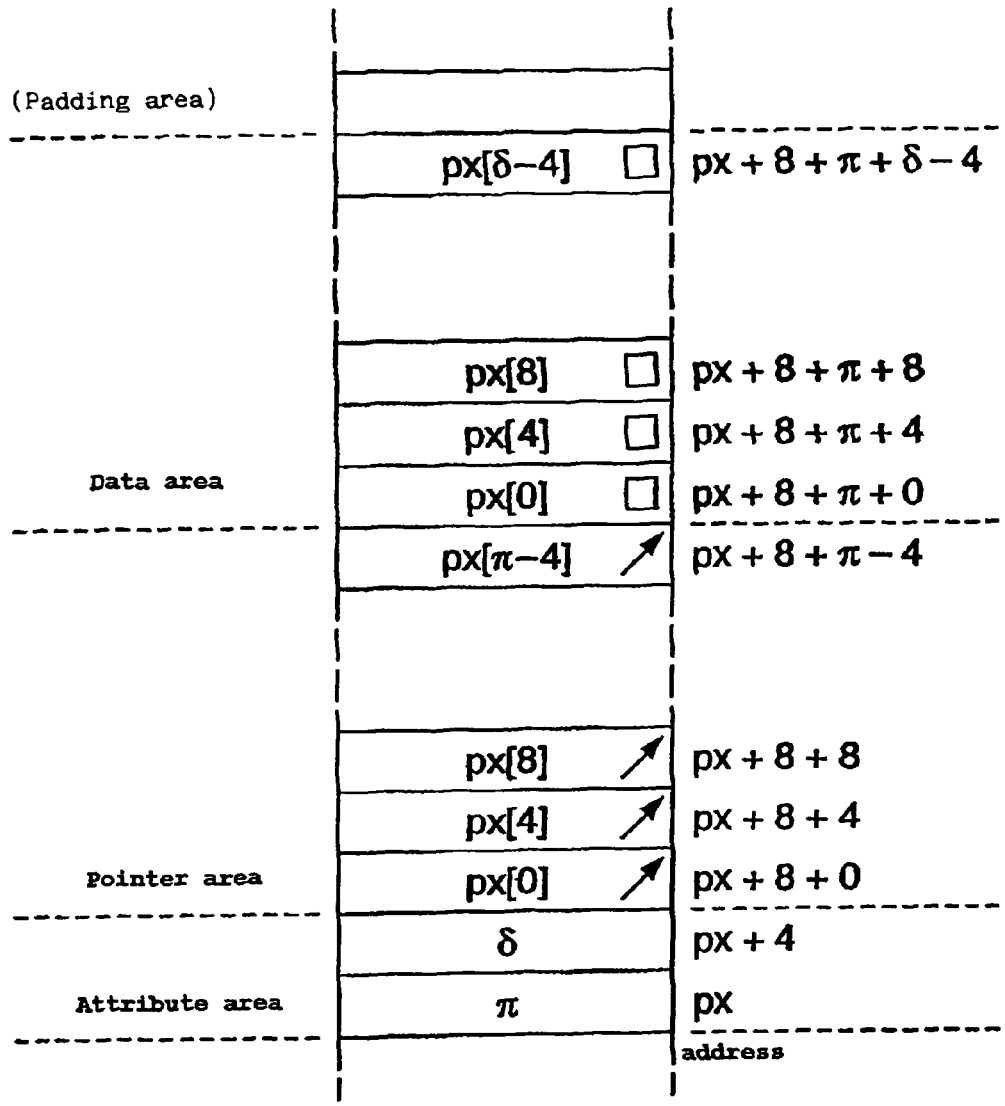
FIG. 5 shows an example of the implementation of the object layout for the present processor architecture.

An exemplary layout of an object in memory is illustrated in FIG. 5. Every object comprises a data area, a pointer area, and an attribute area. For reasons of efficiency, the objects are aligned to addresses divisible by eight, due to which a padding area between two objects may be required under certain circumstances. The attribute area, which is invisible to user programs, contains the π and δ attributes of the object. Because of the support of byte and halfword operands, the present implementation slightly alters the definition of π and δ, since they now describe the number of bytes instead of the number of words in the corresponding area.

Since π must be a multiple of 4, two bits remain unoccupied in the memory word which is used for the π attribute. These may be used to store the φ attribute (or parts thereof) and/or by a garbage collector.

A pointer directly contains the physical memory address of the object. Since the objects are aligned according to double words, the object address only occupies 29 bits of a pointer word. The remaining three bits may be used to store the φ attribute (or parts thereof) and/or by a garbage collector.

Before the access to an object, the attributes of the object must be known, since these are necessary for the range check before the access and, in the case of an object layout according to FIG. 5, are additionally required for address generation in the case of a data access.

Figure 6:
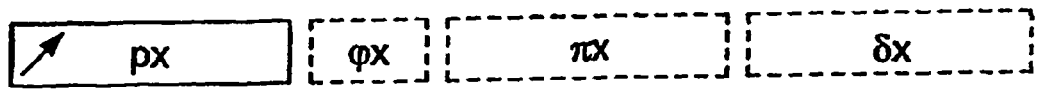
FIG. 6 schematically shows a pointer register having attributes.

Since the loading of the attributes from memory before every object access is connected with a large overhead, attribute registers are provided for every pointer register, as is schematically illustrated in FIG. 6. If a pointer register contains a value which is not null, the corresponding attribute register contains the attributes of the object to which the pointer register refers. In this way, the outlay for the dereferencing of a pointer register is as small as the outlay for address generation in conventional architectures. The range check itself is not connected to any performance losses, since it may be performed parallel to the address calculation.

However, the attribute registers have their price: when a pointer must be loaded from the memory, the associated attributes must also be loaded into the attribute register. In addition, the location of the attributes in the memory is only known when the loading of the pointer is finished.

This problem may be efficiently solved by an additional pipeline stage after the typical memory stage in the case of an RISC architecture. This additional stage is referred to as the attribute stage and uses an attribute cache in order to execute attribute accesses, in most cases without performance losses. The construction of the attribute cache is similar to that of a typical data cache. The attribute cache is addressed by the upper 29 bits of a pointer and allows the reading or writing of the π and δ attributes in a single step. The essential difference from a data cache is the size of the cache lines. While cache lines in data caches typically comprise 8 words, a line of the attribute cache has a width of 2 words and only contains the attributes of a single object.

Figure 7:
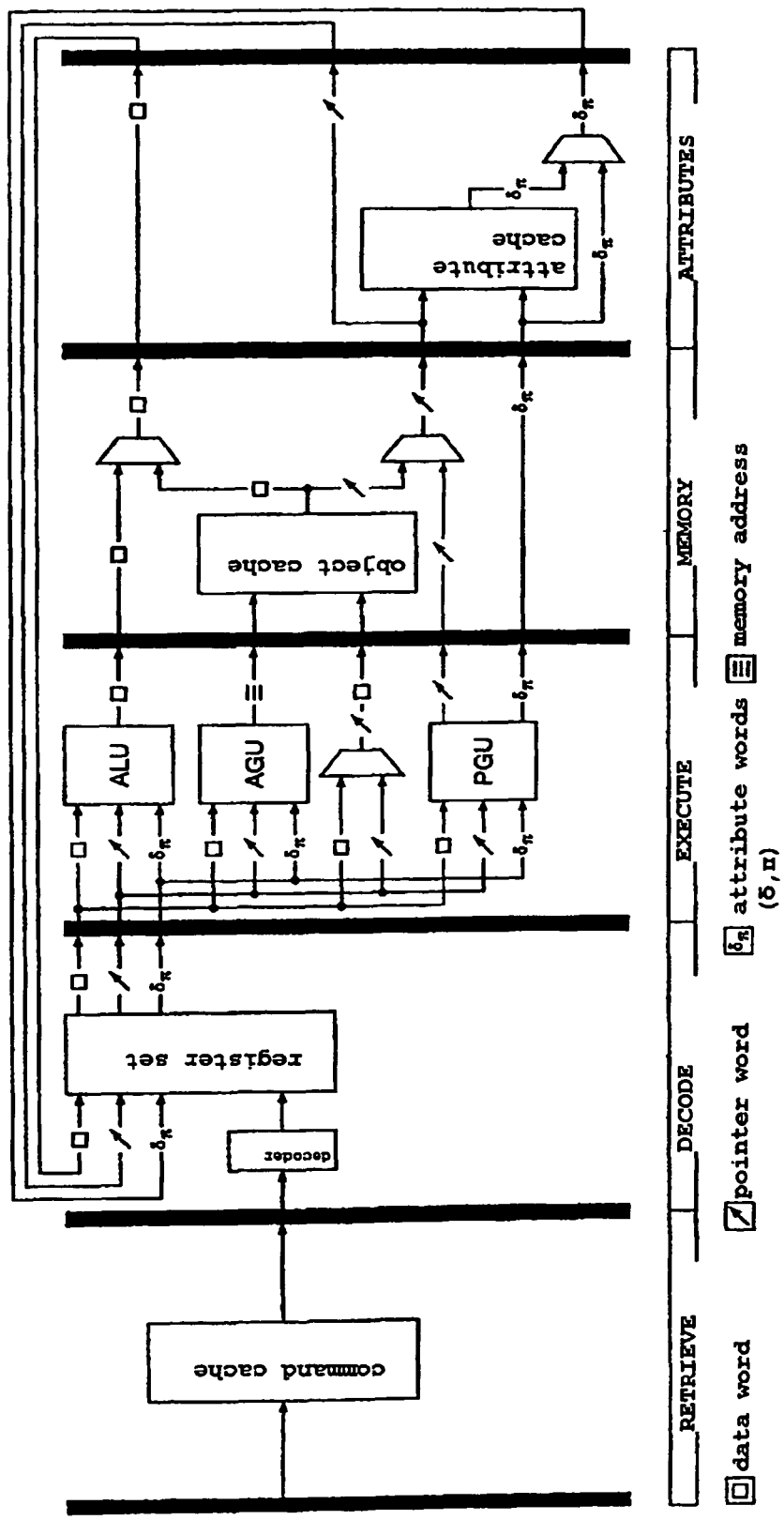
FIG. 7 schematically shows an example of the implementation of a pipeline for the present processor architecture (simplified illustration)

FIG. 7 shows the basic structure of the implemented pipeline and FIG. 8 shows the decomposition of all pointer-related instructions to the individual pipeline stages. The processing of the two most complex instructions is described for exemplary purposes as an illustration.

1. "Load Pointer" Instruction:

In the execution stage of the pipeline, the address generation unit (AGU) calculates the memory address of the pointer to be loaded and, parallel thereto, performs the runtime tests prescribed by the architecture, such as range checks and null pointer tests. In the memory stage, the calculated address is used in order to read the pointer from the object cache. The loaded pointer then addresses the attribute cache in order to load the attributes from the object to which the loaded pointer refers. Finally, the loaded pointer is written together with the loaded attributes in the register set.

2. Object Creation Instruction:

The size of the object to be generated is determined with the aid of two data operands, which are relayed from the decoding stage to the execution stage. In the execution stage, the pointer generation unit (PGU) is responsible for the creation of the pointer to the new object. In the case of a compacting garbage collector, the PGU may determine the start address of the new object very simply by adding the object size to the content of an assistant register which always refers to the last occupied word in area of the heap which is used for the creation of new objects. The PGU is supported by the AGU, which creates the addresses required for pointer initialization. In an object cache having cache lines of 8 words, up to 8 pointer words may be initialized simultaneously in a clock cycle. In this way, the object creation instruction passes through the execution stage without delay if the start address of the object may be calculated within one clock cycle and if all pointers in the object belong to the same cache line. If this is not the case, the pipeline is stopped until the initialization is finished or an interruption occurs. Finally, the attributes of the newly generated object are written in the attribute cache, and the pointer together with its attributes in the register set. If an interrupted object creation instruction arrives at the end of the pipeline, the status of the interrupted object generation is written in a system register and the incompletely initialized object is identified with the φ attribute for uninitialized objects. The initialization is resumed again as soon as the execution context (instruction counter, system registers) of the interrupted program is resumed again.

The functional capability of the suggested architecture was proven on the basis of a functioning prototype. In this prototype, the garbage collector is implemented as a microprogrammed coprocessor which works together closely with the pipeline of the main processor. The synchronization between processor and coprocessor is completely implemented in hardware. The processor and the coprocessor for garbage collection are described in VHDL and synthesized jointly for a modern programmable logic device. Furthermore, there are a prototypical Java compiler and the implementation of a subset of the Java classic libraries for the architecture.

Figure 9:
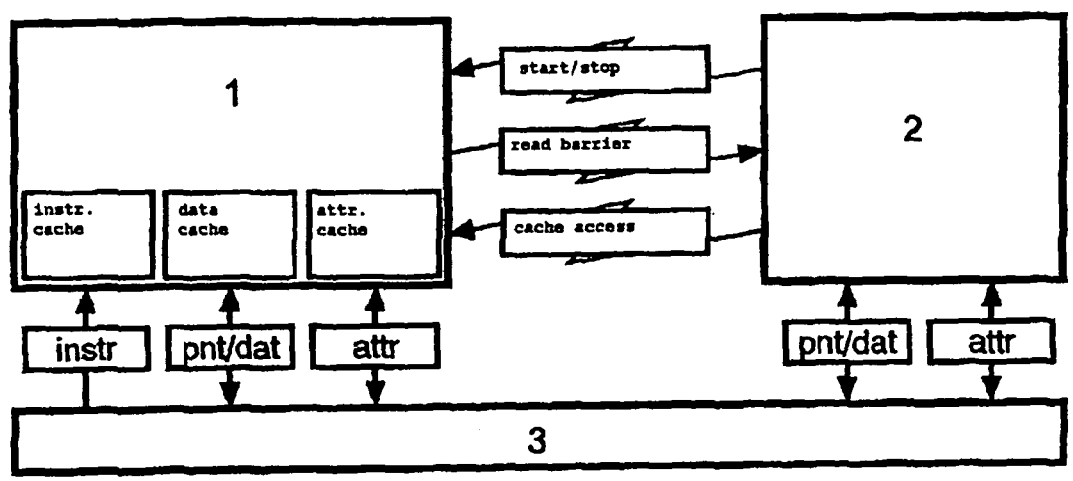
FIG. 9 shows a schematic illustration of an example of the present device.

FIG. 9 shows a schematic illustration of an example of the present device. The garbage collector is formed in this example by a microprogrammable coprocessor. The processor architecture according to the present invention is implemented in the main processor 1. A memory controller 3 having multiple separate ports for the main processor 1 and the coprocessor 2 produces the connection to the main memory. The synchronization between main processor and coprocessor occurs on different levels. The garbage collector flushes or empties lines of the data and attribute cache when necessary in order to ensure cache coherence. A hardware read barrier, which is integrated in the processor pipeline, may trigger interrupts in the garbage collector. The garbage collector may also stop the main processor 1 in order to protect critical areas in the microcode.

The invention claimed is:

1. A processor architecture in which the access to a memory occurs via pointers which refer to objects, the processor architecture comprising:
pointer registers of a register set, wherein the pointer registers are used for the access to objects in the memory; and
data registers of the register set separate from the pointer registers;
wherein each of the objects comprises a pointer area and a data area separately from one another, wherein the pointer area stores pointers, the pointers containing memory addresses of objects to which the pointers refer, wherein the data area stores data, the objects being provided with attributes which are stored in the objects themselves and the attributes describe a length of the pointer area and a length of the data area, wherein load and store instructions for data move data exclusively between the data areas of objects and the data registers, and wherein load and store instructions for pointers move pointers exclusively between the pointer areas of objects and the pointer registers.

2. The processor architecture according to claim 1,
wherein the processor architecture ensures that every pointer contains only either a predefined null value or the memory address of an existing object.

3. The processor architecture according to claim 1,
wherein an instruction set having separate instructions for data and pointer operations is used.

4. The processor architecture according to claim 1,
wherein load and store operations for pointers exclusively load pointers from the pointer areas of the objects into the pointer registers and/or store the content of pointer registers into the pointer areas of the objects, and
wherein load and store operations for data exclusively load data from the data areas of the objects in data registers and/or store the content of data registers in the data areas of the object.

5. The processor architecture according to claim 1,
wherein an instruction set having an object creation instruction is used, which initializes all pointers in the pointer area of a created object with a null value before the created object may be accessed.

6. The processor architecture according to claim 5,
wherein the object creation instruction may be interrupted and resumed at a later point in time.

7. The processor architecture according to claim 6,
wherein in the event of interruption of the object creation instruction, incompletely initialized objects are created, which are clearly differentiated by the processor architecture from completely initialized objects.

8. The processor architecture according to claim 1,
wherein the processor architecture supports constant objects which are kept in a separate memory area that is exclusively read at program runtime, and
wherein pointers to constant objects are clearly identified by the processor architecture.

9. The processor architecture according to claim 1,
wherein a program stack is used, which is divided into a pointer stack area and a data stack area, a length of the occupied part in each of the two stack areas being indicated by a stack index, which is managed in a data register reserved for this purpose.

10. The processor architecture according to claim 9,
wherein an instruction is used for pushing a pointer onto the pointer stack, which both stores the corresponding pointer onto the pointer stack and also increases the pointer stack index in a non-interruptible way.

11. The processor architecture according to claim 1,
wherein the processor architecture supports static objects which are kept in a separate memory area, which is managed by an operating system, and
pointers to static objects are clearly identified by the processor architecture.

12. The processor architecture according to claim 11,
wherein static objects are used for the program stack and that the attributes contained in the object describe the length of an actually occupied part of the stack area in the event of an inactive program stack.

13. The processor architecture according to claim 1, further comprising:
an attribute register assigned to every pointer register, in which the attributes of the object to which the pointer in the pointer register refers are written.

14. The processor architecture according to claim 1,
wherein a pipeline having an additional pipeline stage is used for loading the attributes.

15. The processor architecture according to claim 1,
wherein an attribute cache is used.

16. The processor architecture according to claim 1,
wherein a RISC instruction set is used.

17. The processor architecture according to claim 1,
wherein the processor architecture performs automatic garbage collection.

18. A processor having a processor architecture in which access to a memory occurs via pointers which refer to objects, the processor architecture comprising:
pointer registers of a register set, wherein the pointer registers are used for the access to objects in the memory; and
data registers of the register set separate from the pointer registers;
wherein each of the objects comprises a pointer area and a data area separately from one another, wherein the pointer area stores pointers, the pointers containing memory addresses of objects to which the pointers refer, wherein the data area stores data, the objects being provided with attributes which are stored in the objects themselves and the attributes describe a length of the pointer area and a length of the data area, wherein load and store instructions for data move data exclusively between the data areas of objects and the data registers, and wherein load and store instructions for pointers move pointers exclusively between the pointer areas of objects and the pointer registers.

19. A device comprising:

a main processor having a processor architecture in which access to a memory occurs via pointers which refer to objects, the processor architecture comprising:

pointer registers of a register set, wherein the pointer registers are used for the access to objects in the memory; and data registers of the register set separate from the pointer registers;

wherein each of the objects comprises a pointer area and a data area separately from one another, and wherein the pointer area stores pointers, the pointers containing memory addresses of objects to which the pointers refer, wherein the data area stores data, the objects being provided with attributes which are stored in the objects themselves and the attributes describe a length of the pointer area and a length of the data area, wherein load and store instructions for data move data exclusively between the data areas of objects and the data registers, and wherein load and store instructions for pointers move pointers exclusively between the pointer areas of objects and the pointer registers; and a coprocessor operative to perform automatic garbage collection and being closely coupled to the main processor for efficient synchronization.

20. A system including an embedded processor architecture having access to a memory which occurs via pointers that refer to objects, the embedded processor architecture comprises:

pointer registers of a register set, wherein the pointer registers are used for the access to objects in the memory; and data registers of the register set separate from the pointer registers;

wherein each of the objects comprises a pointer area and a data area separately from one another, and wherein the pointer area stores pointers, the pointers containing memory addresses of objects to which the pointers refer, wherein the data area stores data, the objects being provided with attributes which are stored in the objects themselves and the attributes describe a length of the pointer area and a length of the data area, wherein load and store instructions for data move data exclusively between the data areas of objects and the data registers, and wherein load and store instructions for pointers move pointers exclusively between the pointer areas of objects and the pointer registers.

\* \* \* \* \*